United States Patent

Tom

Patent Number: 5,107,120
Date of Patent: Apr. 21, 1992

[54] PASSIVE INFRARED DETECTOR

[75] Inventor: Edward Tom, Philadelphia, Pa.

[73] Assignee: Pennwalt Corporation, Philadelphia, Pa.

[21] Appl. No.: 411,544

[22] Filed: Sep. 22, 1989

[51] Int. Cl.[5] .............................................. G01J 5/08
[52] U.S. Cl. ................... 250/342; 250/338.3; 340/567
[58] Field of Search ............ 250/342, 338.3; 340/567, 600

[56] References Cited

U.S. PATENT DOCUMENTS

| | | | |
|---|---|---|---|
| 3,839,640 | 10/1974 | Rossin | 250/353 |
| 3,896,311 | 7/1975 | Taylor et al. | 250/342 |
| 3,999,069 | 12/1976 | Taylor et al. | 250/338 |
| 4,052,616 | 10/1977 | Keller | 250/353 |
| 4,081,680 | 3/1978 | Keller | 250/342 |
| 4,225,786 | 9/1980 | Perlman | 250/342 |
| 4,321,594 | 3/1982 | Galvin et al. | 340/567 |
| 4,322,124 | 3/1982 | Pudgitt et al. | 250/338.1 |
| 4,375,034 | 2/1983 | Guscott | 250/342 |
| 4,379,971 | 4/1983 | Smith et al. | 250/342 |
| 4,523,095 | 6/1985 | Keller-Steinbach | 250/349 |
| 4,617,463 | 10/1986 | Muirhead | 250/342 |
| 4,644,147 | 2/1987 | Züblin | 250/221 |
| 4,769,545 | 9/1988 | Fraden | 250/353 |
| 4,873,469 | 10/1989 | Young et al. | 250/342 |
| 4,896,039 | 1/1990 | Fraden | 250/342 |
| 4,930,864 | 6/1990 | Kuster et al. | 250/342 |

OTHER PUBLICATIONS

Fraden, "Passive Infrared Motion Detection", Sensors (Nov. 1988), pp. 40–42.

One-page technical information sheet entitled "FIRM-287 Motion Detection Module", American IRIS Corp.

Primary Examiner—Jack I. Berman
Assistant Examiner—Richard Hanig
Attorney, Agent, or Firm—Woodcock, Washburn, Kurtz, Mackiewicz & Norris

[57] ABSTRACT

A passive infrared detector, including a pyroelectric sensor with three pairs of contiguous, active elements and a Fresnel lens with a plurality of segments each of which has an optical center and an equivalent focal length, each pair of active elements disposed in different plane, with each optical center juxtaposed to the plane of at least one of those active elements, substantially at the focal length.

25 Claims, 3 Drawing Sheets

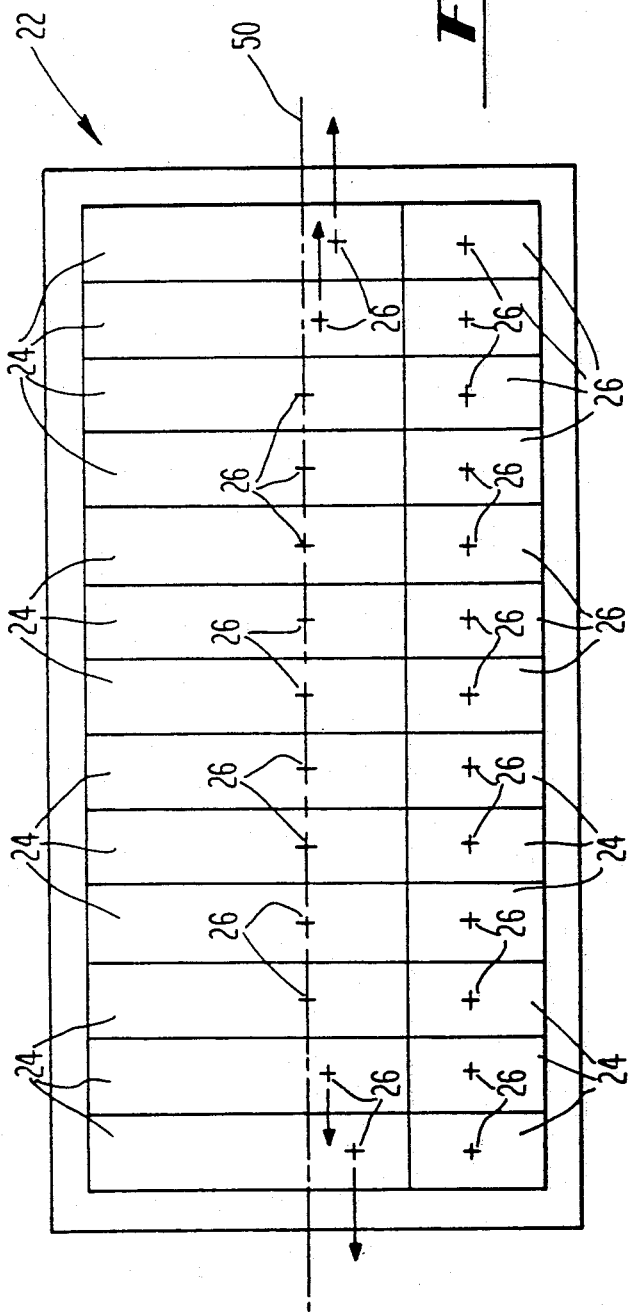
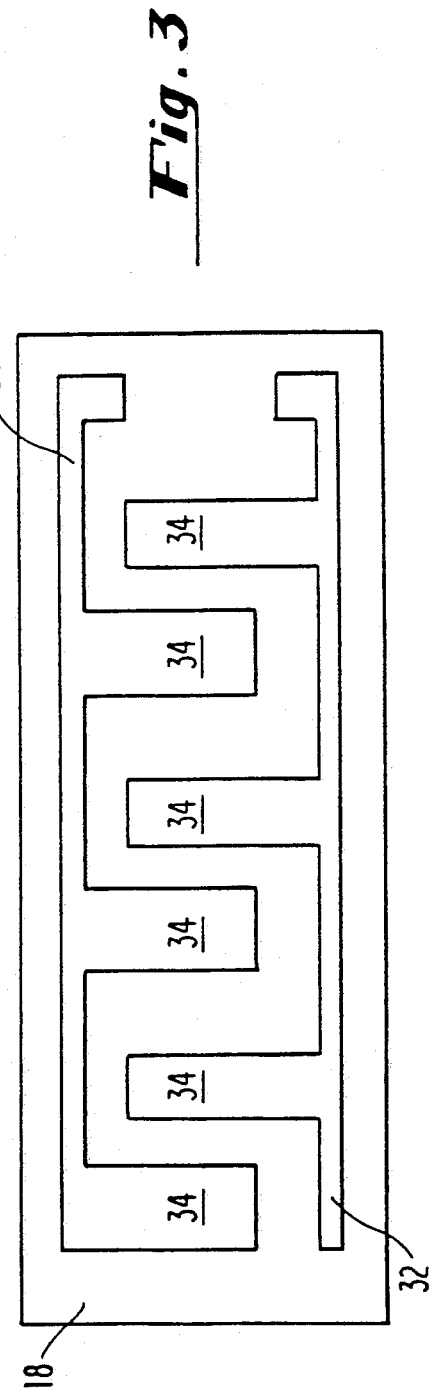
Fig. 4
Fig. 3

PASSIVE INFRARED DETECTOR

BACKGROUND OF THE INVENTION

1. Field of the Invention

This invention relates generally to passive infrared detectors, and more particularly to a method and apparatus for expanding the field of view in such passive infrared detectors.

2. Statement of the Prior Art

A primary objective for most passive infrared detectors is the capability for providing a "field of view" of at least 180 degrees. As is well known, a detector's field of view is defined not only by the horizontal angles but also by the vertical angles which determine the area covered by such detector Nevertheless, it is the horizontal angle of at least 180 degrees that comprises the most desirable quality of a passive infrared detector.

In the past, a passive infrared detector has typically achieved the objective through one of two basic approaches. One known approach uses a mirror in conjunction with a single sensor to passively detect changes in thermal radiation in the infrared spectrum. Illustrative of the mirror and single sensor approach are U.S. Pat. No. 4,052,616, issued Oct. 4, 1977 to Keller; U.S. Pat. No. 4,081,680, issued Mar. 28, 1978 to Keller; and U.S. Pat. No. 4,225,786, issued Sep. 30, 1980 to Perlman. An inherent problem which exists when mirrors are used, however, is the optical dispersion experienced by mirrors. These optical dispersion losses are also aggravated by a corrosive environment within which many passive infrared detectors are used. Mirrors, furthermore, take an individual sensor element out of focus from its corresponding Fresnel lens segment and thereby decreases the sensitivity of the particular sensor element. Such decreases in the sensitivity of an individual sensor element will, typically, manifest itself as asymmetrical lobes when comparing sensitivity of side beams in the conventional passive infrared detector with the sensitivity of its forward-looking beams. It is, therefore, desirable to eliminate the use of mirrors in a passive infrared detector according to the present invention.

Another known approach utilizes a pair of detectors, in the manner disclosed in U.S. Pat. No. 4,523,095, issued Jun. 11, 1985 to Keller-Steinbach. It can be readily appreciated that the use of two detectors instead of one detector synergistically more than doubles the inherent problems which are related to alignment of the pair of detectors. Not only are these detectors extremely difficult to mechanically align one to the other, but also active element alignment with the corresponding optics in both detectors is even more difficult to achieve. Such difficulty lies with the control of vertical alignment between each active element and the optical centers of conventionally used Fresnel lens, and with the relative angles between the detectors for purposes of eliminating aliasing. Another inherent problem that is experienced with such passive infrared detectors using a pair of detectors is a lack of adequate common mode rejection of one detector to the other. For most passive infrared detectors using this approach, outputs from each detector are coupled to a differential amplifier. Therefore, unless the detectors are painstakingly matched to one another, any particular mechanical stimuli will cause such detectors to respond differently and thereby minimize common mode rejection capability. It is, accordingly, also desirable to avoid using two detectors in a passive infrared detector according to the present invention.

One known passive infrared detector that not only avoids utilizing two detectors, but also eliminates the use of mirrors is disclosed in the recently issued U.S. Pat. No. 4,769,545, Fraden. Fraden suggests that a very wide field of view (i.e., up to a 180-degree solid angle) is achievable with a passive infrared detector that generally comprises a pyroelectric sensor with interdigitated electrodes on one of the sensor's surfaces and a uniform electrode on the other surface. Interdigitated pyroelectric sensors of this type are extremely well known; e.g., see U.S. Pat. No. 4,379,971, issued Apr. 12, 1983 to Smith et al. Thermal, infrared radiation is collected by a Fresnel lens which is curved to the angle of the desired field of view, and focused upon the pyroelectric sensor by positioning such sensor at a distance which is approximately equal to the focal length of the lens. In other words, as Fraden notes, the lens and the sensor form a cylindrical surface with such lens and sensor on opposite sides of the cylinder.

A major drawback of the Fraden passive infrared detector is its relative inability to achieve fields of view of 180 degrees or more. Because the lens and sensor either form a cylindrical or a spherical surface with the lens and sensor opposing one another, the Fraden passive infrared detector cannot achieve fields of view of 180 degrees or more due to the relative positions of individual interdigitated sensing "elements" and corresponding lens segments. Indeed, in an article by Fraden, entitled "Passive Infrared Motion Detection", which appeared at pp. 40–42 in the November 1988 issue of the Sensors journal, the author notes that a "fisheye" detector corresponding substantially to passive infrared detectors that are disclosed and claimed in U.S. Pat. No. 4,769,545 experience 160-degree fields of view. Recently released "technical information" concerning such fisheye detectors, available from the assignee of the Fraden patent, further indicates that the horizontal angle of view with such fisheye detectors is 164 degrees.

Notwithstanding its relative inability to achieve fields of view of 180 degrees or more, the passive infrared detector that is disclosed in U.S. Pat. No. 4,769,545 additionally suffers two other disadvantages. First, due to the opposing nature of the lens and sensor used in such passive infrared detectors, larger overall detector sizes are practically unavoidable. It would be desirable, therefore, to provide a passive infrared detector of substantially smaller sizes than a fisheye detector according to Fraden. Second, Fraden's passive infrared detector is susceptible to beam crossing and subsequent signal cancellation because three lens segments are used for focusing thermal radiation upon individual interdigitated sensor elements. Another desirable characteristic of such passive infrared detectors according to the present invention would be the provision of a beam pattern including a plurality of discrete, non-interfering beams of substantially uniform strength.

SUMMARY OF THE INVENTION

Accordingly, it is a general object of this invention to provide an improved passive infrared detector. More particularly, it is an object to provide a passive infrared detector with fields of view of 180 degrees or more.

It is another object of this invention to provide passive infrared detectors having expanded fields of view without utilizing mirrors.

A further object is to provide passive infrared detectors having expanded fields of view without utilizing more than one detector.

It is also an object of this invention to provide smaller passive infrared detectors.

A further object is to provide passive infrared detectors having a beam pattern which includes a plurality of discrete, non-interfering beams of substantially uniform strength, and to thereby avoid problems of detection beam cancellation.

Briefly, these and other objects according to the present invention are accomplished by an improved passive infrared detector having a pyroelectric sensor which includes three contiguous pairs of active elements, and a Fresnel lens which includes a plurality of segments each of which has an optical center and an equivalent focal length. The improvement generally comprises means for disposing each pair of the active elements in a different plane and means for juxtaposing each optical center to the plane of at least one of the pairs of active elements, substantially at the focal length.

In a presently preferred embodiment of this invention, the passive infrared detector includes a substantially trapezoidal shape pyroelectric sensor having interdigitated pairs of active elements in a plane that is parallel to the surface of the detector substrate, and other interdigitated pairs of active elements, one pair on either side of the parallel plane and depending 45 degrees therefrom. Positioning of a pair of the active elements on each surface will, thus, obtain common mode rejection. A substantially semicylindrical shape Fresnel lens is juxtaposed above the three active element pairs of the pyroelectric sensor, and the optical centers of lens segments at the ends of such Fresnel lens are adjusted for purposes of assuring that the field of view of the passive infrared detector is 180 degrees or more.

Other objects, advantages and novel features according to this invention will become more apparent from the following detailed description of the preferred embodiment, when considered in conjunction with the accompanying drawings wherein:

BRIEF DESCRIPTION OF THE DRAWINGS

FIG. 3 is a bottom view of the pyroelectric sensor shown in FIG. 2;

FIG. 4 diagrammatically illustrates one Fresnel lens that is useful with the passive infrared detector in accordance with the preferred embodiment of this invention.

DETAILED DESCRIPTION OF THE PREFERRED EMBODIMENTS

Figure 1:
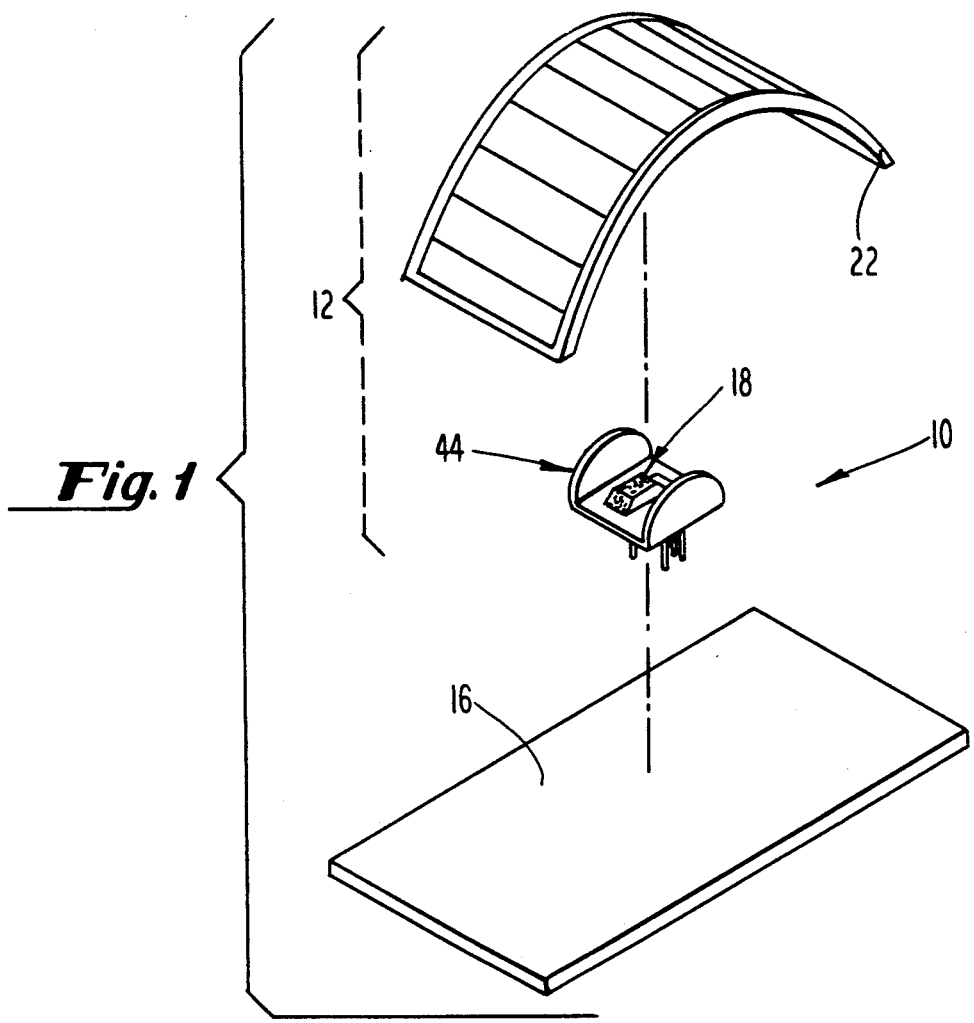
FIG. 1 is a partially exploded view of a passive infrared detector according to the preferred embodiment of this invention.

Referring now to the drawings, wherein identical numbers designate like or corresponding parts throughout the several views, there is shown in FIG. 1 apparatus for detecting thermal radiation, particularly within the infrared spectrum. Apparatus 10 generally includes passive means 12 for producing a beam pattern 14 (FIG. 2) which extends across a field of view of at least 180 degrees, and interface means 16, connected to the passive beam pattern producing means 12, for outputting a signal in response to any changes in the thermal radiation within the beam pattern 14. In order to do so, the passive beam pattern producing means 12 includes means 18 for detecting changes in thermal radiation within the beam pattern 14.

Figure 2:
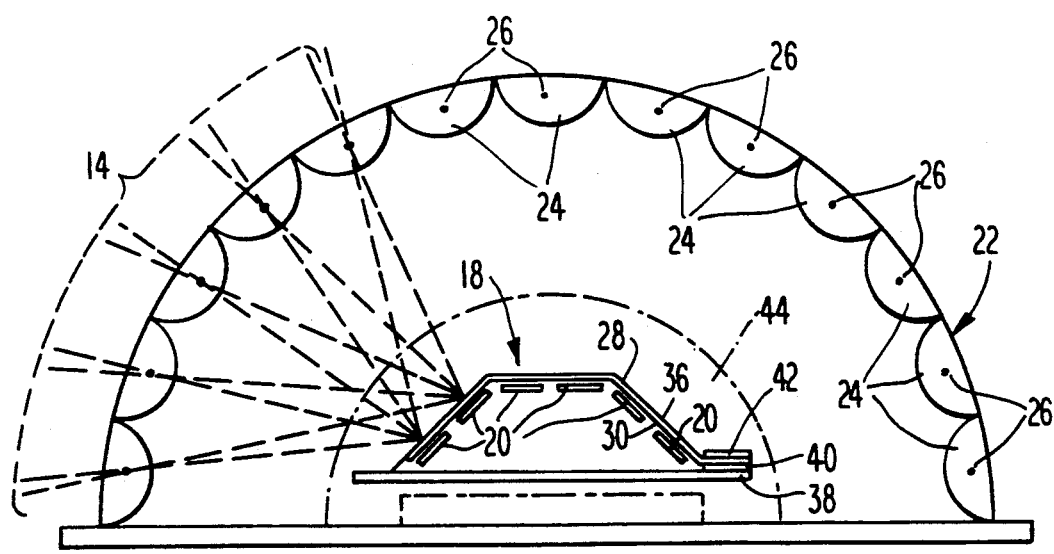
FIG. 2 shows a side view of the passive infrared detector of FIG. 1.

Referring also now to FIGS. 2 and 3, it can be seen that the passive beam pattern producing means 12 comprises pyroelectric sensor 18 having two or more active elements 20, and lens means 22 for focusing the thermal radiation on the active elements 20. As shown in FIG. 2, the beam pattern 14 extends only across a portion of the entire field of view for purposes of illustration. However, it should be noted that the beam pattern 14 of apparatus 10 extends 180 degrees or more in the manner shown in FIG. 2. The lens means 22 preferably comprises relatively simple Fresnel lens, formed by a plurality of segments 24, each of which has an optical center 26. One particularly suitable Fresnel lens is manufactured by Fresnel Technologies, Inc. of Fort Worth, Tex. USA.

Pyroelectric sensor 18 comprises a poled, pyroelectric polymeric film, such as Kynar polyvinylidene fluoride film, and copolymers thereof such as vinylidene fluoride-trifluoroethylene copolymer films, which are manufactured by the Pennwalt Corporation of Philadelphia, Pa. Detailed information regarding particular piezo films of this type is found in a "Kynar ® Piezo Film Product Summary and Price List" (1988) and in Kynar ® Piezo Film Technical Manual (1987) which are distributed by the Pennwalt Corporation of Philadelphia, Pa., and are incorporated herein by reference.

An upper surface 28 of the film is made proximal to the lens means 22, and a lower surface 30 is made distal thereto. Two electrodes 32 are formed upon one of the two surfaces, preferably on the lower surface 30, and each electrode 32 has a plurality of legs 34 interdigitated with the legs 34 of the other electrode 32 as is clearly shown in FIG. 3. Each leg 34, therefore, defines an "active element", and an interdigitated pair of the legs 34 forms an active element pair. An electrically conductive layer 36 is provided for covering the upper surface 28. There is several conventional methods of metallization such as sputtering, vacuum deposition or screen printing which may be used to apply electrodes 32 and layer 36 to the lower and upper surfaces 30, 28 of pyroelectric sensor 18, although a presently preferred method of such application is a thinly sputtered metallization.

Conductive silver ink or carbon ink is preferably employed in cases where screen printing is used, but other known conductive materials may be employed in cases where vacuum deposition is used. Copper, silver, nickel, aluminum, tin, chromium and gold, and combinations of those metals may be utilized when vacuum deposition is employed. Such vacuum-deposited layers should not exceed more than about 1000 Angstroms, and silk-screened inks can be applied in thicknesses of from about five microns to about seven microns. Conveniently, one surface will, thus, form a negative pole and the other surface will form a positive pole.

Figure 5:
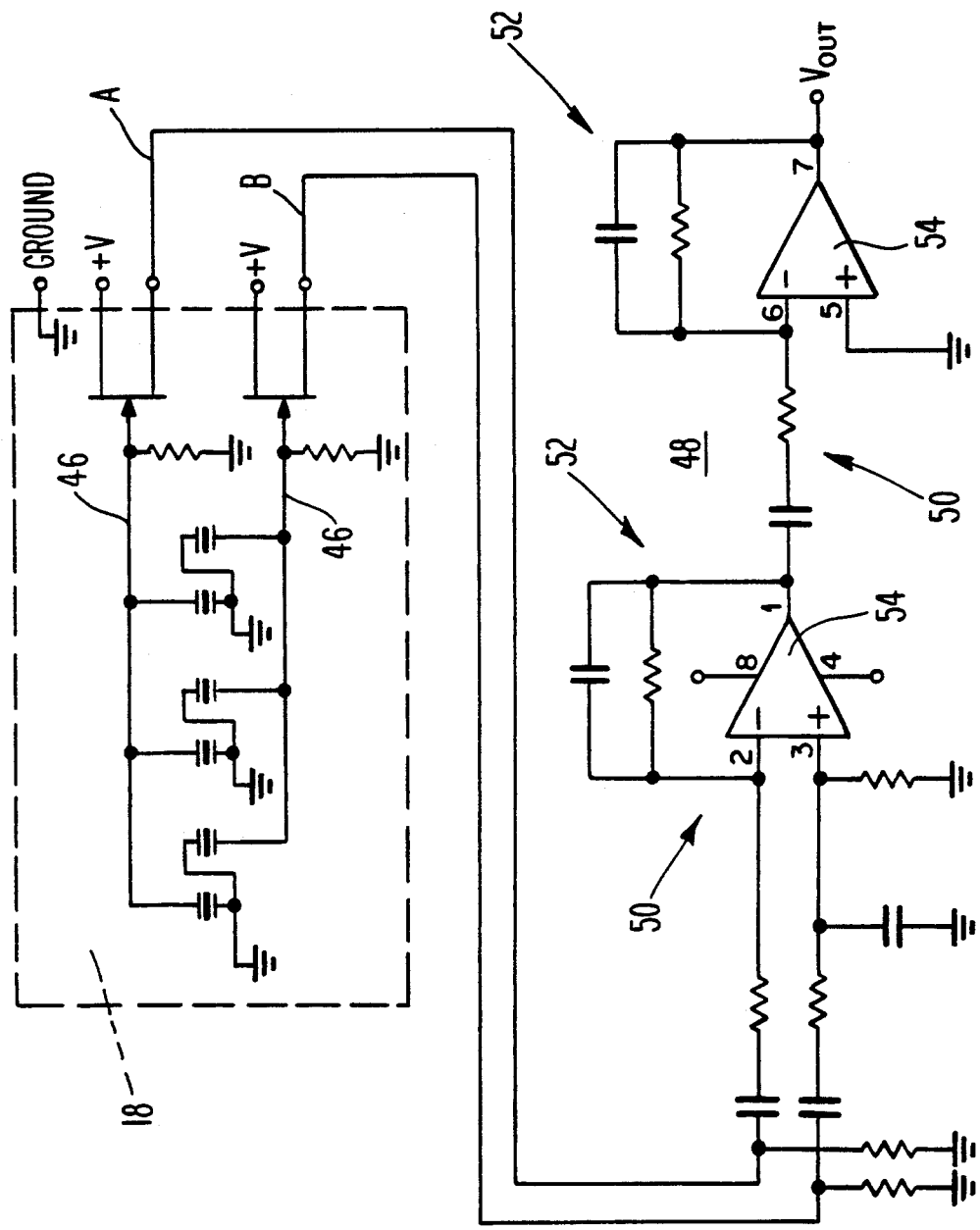
FIG. 5 is a schematic of interface circuitry.

One end of the pyroelectric sensor 18 is attached to the detector's substrate, comprising a printed circuit board 38, by an adhesive, epoxy or coating 40 which is conductive for enabling the pyroelectric sensor 18 to be electrically coupled to the interface means shown in FIGS. 1 and 5. Then, the pyroelectric sensor 18 is pressed onto the substrate, held in place by conductive rubber pad 42 and a sensor housing 44. As is apparent, conductive rubber pad 42 will absorb compressive force that may be exerted by the sensor housing 44 upon the pyroelectric sensor 18, and will eliminate any abrasive effects that may result. A conductive rubber pad 42 will also act as a static shield for the entire unit, and as the ground connection for the pyroelectric sensor 18 to printed circuit board 38. The sensor housing 44, likewise, may suitably comprise static shield means for substantially avoiding the well known problems of electrostatic discharge ("ESD") and electromagnetic interference ("EMI").

As is shown schematically in FIG. 5, the interdigitated legs of electrodes 32 on the poled polymeric film are connected in a dual channel arrangement. Each of the channels 46 is routed for providing a respective output signal A, B. Both output signals A and B are, in turn, coupled to operational amplifier means 48 that provides preselected low and high cutoff frequencies for analysis. In a presently preferred embodiment of this invention, low cutoff frequencies of about 0.10 Hz are possible with a high-pass filter 50 as shown generally in FIG. 5, while high cutoff frequencies of about 4.8 Hz are possible with a low-pass filter 52. As a result of such dual-channel outputs from the pyroelectric sensor 18, the interface means shown in FIG. 5 will yield an output $V_{OUT}$ such that simple passive infrared detection can be made. The low-pass and high-pass filters 50, 52 may suitably comprise an operational amplifier 54, such as a model LF353 type manufactured by National Semiconductor.

Referring again to FIG. 2, it will be appreciated that each lens segment 24 of Fresnel lens means 22 includes an optical center 26. An "optical center", as is well known, will generally be defined as a point so located on the axis of a lens that a ray which, in its passage through the lens passes through this point, has its incident and emergent parts parallel. It has been found that the field of view in passive infrared detectors that employ a Fresnel lens may be expanded to 180 degrees or more by careful positioning of these optical centers 26. As is shown in FIG. 4, the Fresnel lens means 22 which is used according to a preferred embodiment of this invention has a plurality of lens segments 24, each with their own optical center 26. These optical centers 26 are juxtaposed, with the pyroelectric sensor 18 slightly offset. Positioning of the two outermost optical centers 26 within their respective lens segments 24 will determine the field of view of apparatus 10. With those optical centers 26 positioned as shown in FIG. 4, the field of view of apparatus 10 is 180 degrees. In situations where a desirable field of view of apparatus 10 needs to be more than 180 degrees, however, those optical centers 26 of the two outermost lens segments 24 will be moved outwardly in the directions indicated by the arrows shown in FIG. 4, whereby the optical centers 26 of the two outermost lens segments 24 on both sides of the semicylindrical Fresnel lens means 22 are disposed radially outward from the pyroelectric sensor 18 a distance that is greater than the focal length.

Obviously, many modifications and variations are possible in light of the above teachings For example, trapezoidally-shaped pyroelectric sensor 18 may be easily substituted by a polygon which does not substantially approximate the shape of a circle. Circular shapes would defeat the object of eliminating cancellation of beams that is experienced in passive infrared detectors such as the types shown in U.S. Pat. No. 4,769,545. A pyroelectric sensor with two surfaces, each with a pair of active elements, is included within the scope of this invention. It is to be understood, therefore, that within the scope of the appended claims the present invention may be practiced in other forms than as are specifically described herein.

What is claimed is:

1. Apparatus for detecting thermal radiation, comprising:

passive means for producing a beam pattern of thermal radiation and for detecting changes in the thermal radiation within said beam pattern, said passive means comprising a pyroelectric sensor having a plurality of active elements disposed in different planes and lens means for focusing thermal radiation on said active elements, said lens means comprising a plurality of lens segments each of which has an optical center, wherein said segments are positioned in a generally arcuate pattern so that said thermal radiation focused on said separate planes comprises a pattern of non-interfering beams; and interface means, connected to said passive means, for outputting a signal responsive to changes in the thermal radiation within the beam pattern.

2. The apparatus according to claim 1, wherein said beam pattern comprises a plurality of discrete beams.

3. The apparatus according to claim 2, wherein said plurality of beams is substantially uniform.

4. The apparatus of claim 1, wherein said lens means further comprises two ends and wherein the optical centers for a portion of the lens segments define an axis and wherein the optical centers for the lens segments positioned in each end are offset from said axis.

5. The apparatus of claim 4, wherein first and second lens segments are positioned in each of said ends, wherein the first lens segments are the most distal lens segments and are offset from said axis a first distance and wherein the second lens segments are offset from said axis a second distance, wherein said first distance is greater than said second distance.

6. The apparatus according to claim 1, wherein said plurality of segments have an equivalent focal length.

7. The apparatus according to claim 6, wherein each said optical center is juxtaposed to at least one pair of said active elements substantially at said focal length.

8. A passive infrared detector for detecting thermal radiation in the infrared spectrum, comprising:

a pyroelectric sensor having a plurality of active elements pairs which are disposed in a different plane; and lens means for focusing thermal radiation on said active elements, said lens means having a plurality of segments each of which includes an optical center and an equivalent focal length, for focusing the thermal radiation on said active elements, each said optical center juxtaposed substantially at said focal length to at least one of said active elements, so that said thermal radiation comprises a pattern of non-interfering beams when focused on said active elements.

9. The passive infrared detector according to claim 8, wherein said pyroelectric sensor comprises:

a poled polymeric film having an upper surface that is proximal to said lens means, and a lower surface that is distal from said lens means;

a pair of electrically conductive electrodes on one of said surfaces, each said electrode having a plurality of legs that are interdigitated with the legs of the other electrode; and an electrically conductive layer covering the other surface.

10. The passive infrared detector according to claim 9, further comprising:

a negative pole on said one surface; and a positive pole on said other surface.

11. The passive infrared detector according to claim 9, wherein said polymeric film consists essentially of polyvinylidene fluoride or copolymers thereof.

12. The passive infrared detector according to claim 8, further comprising a detector substrate.

13. The passive infrared detector according to claim 12, wherein said pyroelectric sensor comprises three pairs of active elements.

14. The passive infrared detector according to claim 13, wherein one pair of said active elements comprises a center pair that is juxtaposed parallel to said detector substrate, the other pairs of active elements juxtaposed in planes on either side of said center pair at about 45 degrees therefrom.

15. The passive infrared detector according to claim 14, wherein said active elements are contiguous.

16. The passive infrared detector according to claim 14, wherein said lens means comprises Fresnel lens means including lens segments in a substantially semicircular shape.

17. An improved passive infrared detector of the type having a pyroelectric sensor which includes three pairs of contiguous active elements, and a Fresnel lens which includes a plurality of segments each of which has an optical center and an equivalent focal length, wherein the improvement comprises:

means for disposing each pair of the active elements in a different plane; and means for juxtaposing each said optical center to said plane of at least one pair of the active elements, substantially at the focal length, so that said thermal radiation comprises a pattern of non-interfering beams when focused on said active elements.

18. The improvement according to claim 17, wherein said disposing means comprises a trapezoidally-shaped frame with a pair of opposed 45 degree surfaces.

19. The improvement according to claim 17, wherein said juxtaposing means comprises a substantially semicylindrical-shaped housing with a curvature corresponding to said frame.

20. The improvement according to claim 17, further comprising dual channel circuitry means for outputting a pair of impedance matched outputs each of which is indicative of changes in thermal radiation within a predetermined beam pattern.

21. The improvement according to claim 20, wherein said predetermined beam pattern comprises a plurality of discrete, non-interfering beams of substantially uniform strength.

22. The improvement according to claim 21, wherein said juxtaposing means includes means for directing two or more of said beams through each of the segments in the Fresnel lens.

23. An improved method of detecting thermal radiation with a passive infrared detector of the type having a pyroelectric sensor which includes a plurality of active elements and a Fresnel lens which includes a plurality of lens segments each of which has an optical center and equivalent focal lengths, wherein the method comprises the steps of:

providing a detector substrate;

mounting the pyroelectric sensor as a predetermined geometric shape on said substrate by disposing a pair of active elements in different planes of said predetermined geometric shape; and juxtaposing each optical center to at least one pair of the active elements, substantially at the focal length, so that said thermal radiation comprises a pattern of non-interfering beams when focused on said active elements.

24. The method according to claim 23, wherein said step of juxtaposing each optical center comprises the step of providing the Fresnel lens in a semicylindrical form with a pair of end lens segments.

25. The method according to claim 24, further comprising the step of disposing the optical centers of both end lens segments radially outward from the pyroelectric sensor at a distance greater than the focal length, and thereby extending the field of view more than 180 degrees.

* * * * *